No. 853,053. PATENTED MAY 7, 1907.
E. R. BENNETT & M. I. EKERN.
SAFETY GAS COCK OR VALVE.
APPLICATION FILED MAY 19, 1906.

Witnesses

Inventors
Edwin R. Bennett
and
Melvin I. Ekern
By Henry N. Copp
their Attorney

UNITED STATES PATENT OFFICE.

EDWIN R. BENNETT AND MELVIN I. EKERN, OF FLANDREAU, SOUTH DAKOTA.

SAFETY GAS COCK OR VALVE.

No. 853,053.　　　　Specification of Letters Patent.　　　　Patented May 7, 1907.

Application filed May 19, 1906. Serial No. 317,802.

*To all whom it may concern:*

Be it known that we, EDWIN R. BENNETT and MELVIN I. EKERN, citizens of the United States, residing at Flandreau, county of Moody, and State of South Dakota, have invented certain new and useful Improvements in Safety Gas Cocks or Valves, of which the following is a specification.

Our invention relates to safety gas cocks or valves.

The object of the present invention is the provision of a gas cock or valve having means for automatically locking it when in closed position, said locking device having to be manually released before the valve or cock can be opened, so that the gas cannot be turned on except by premeditation on the part of the user, thereby preventing any looseness of the valve or cock or accidental touch of the key by the user from causing the valve or cock to again open after it has once been turned off.

The invention is set forth fully hereinafter and the novel features thereof are recited in the appended claims.

Figure 1:
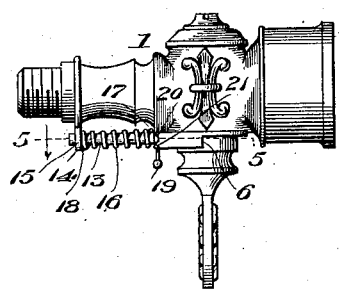
Figure 2:
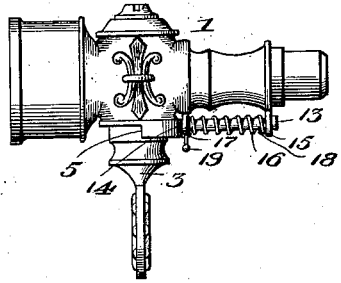
Figure 3:
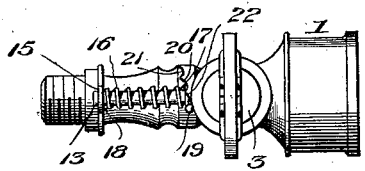
Figure 4:
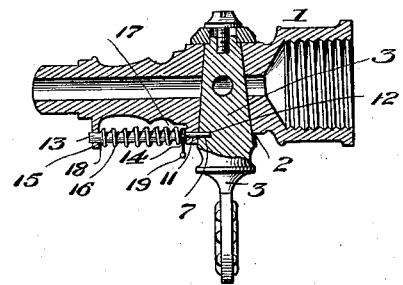
Figure 5:
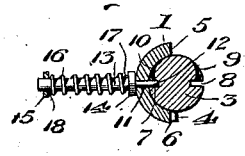
Figure 6:
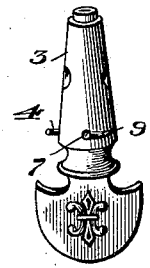
Figure 7:
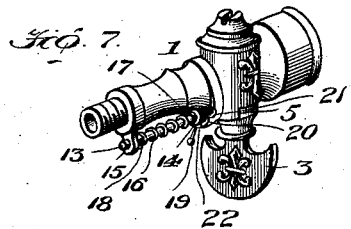

In the accompanying drawings: Figures 1 and 2 are side views of my complete invention; Fig. 3, a bottom view; Fig. 4, a longitudinal section; Fig. 5, a horizontal section on line 5—5 of Fig. 1 taken through the locking mechanism, showing the locking aperture in the valve or cock; Fig. 6, a detail of the cock or valve showing one of the two similar locking pin openings; and Fig. 7, a perspective view of the complete invention.

The valve casing 1 is of ordinary construction, the same being provided with the usual tapered valve-seat 2.

The valve, which is shown at 3, is of ordinary construction, being provided with a pin 4 to strike against the shoulders 5 and 6 on the valve casing when the valve is closed, except that it has, in addition, locking pin openings 7 and 8 located 180° apart, which have cam grooves 9 and 10 leading to them.

An opening 11 is provided in the valve casing to receive a locking pin 12, which has an enlarged part 13 provided with a head 14, said enlarged part 13 being journaled in an eye or bearing 15 on the casing 1, said bearing or eye permitting turning and longitudinal movement of the pin and its enlarged part. Surrounding the enlarged part 13 is a coil spring 16 which is secured at 17 to the collar or head 14, and its other end is secured to the valve casing at 18, said spring having a tendency to both rotate and project the pin.

The finger-piece 19 is secured to the collar 14 and is positioned to engage either one of two different notches 20 or 21 or to lie against the tooth 22.

When the finger-piece 19 is against the tooth or shoulder 22, the locking pin is projected into one or the other of the locking pin holes 7 or 8 (assuming the valve to be turned one way or the other and closed) and said valve cannot then be turned. When the finger-piece 19 is shifted (against the action of the coil spring) and allowed to rest in the notch 20, the locking pin is retracted sufficiently so that upon turning of the valve by hand, the locking pin will ride up one or the other of the grooves 9 or 10 (as the case may be) and the continued turning of the valve will release the finger-piece from the notch 20, whereupon the coil spring will snap the finger-piece out of alinement with the notch and into position so that when the valve has been turned to the opposite extreme, or completely closed again, the said coil spring will snap the finger-piece to its original position and cause the locking pin to snap into the other of the two locking pin holes 7 or 8, thereby locking the valve so that it cannot be turned open except upon again placing the finger-piece in the notch 20. When the valve is turned back again, the foregoing operation will be repeated. When the valve is allowed to remain open, the gas burning, the valve may be turned within wide limits to raise or lower the gas or until the valve is completely closed so that all necessary regulation is provided for.

If it is desired to prevent locking of the valve altogether, the finger-piece can be turned and allowed to engage the notch 21, at which time the locking pin will be completely retracted and out of engagement with the valve.

To take up any longitudinal lost motion in the valve, I find it advantageous to employ a small coil spring between the valve washer and the valve casing.

Having thus described our invention, what we claim as new and desire to secure by Letters Patent, is:—

1. In a safety gas cock or valve, the combination with a rotary gas valve or cock, of an automatically operating latching or locking device adapted for coöperation therewith to effect its release and to secure the valve, and means for holding said latching or locking device partially retracted so that it may be completely released by the valve upon turning of the valve for later engagement with the valve.

2. In a safety gas cock or valve, the combination with a rotary or turning plug or valve having a locking pin opening, and a cam surface leading to said opening, of a spring-actuated locking pin positioned to snap into the opening aforesaid or to bear on the cam surface aforesaid, and a catch for holding the locking pin raised out of the opening aforesaid in position for engagement by the cam surface, said cam surface being adapted, on turning of the valve, to disengage the locking pin from its catch.

3. In a safety gas cock or valve, the combination with a rotary or turning plug or valve having a locking pin opening, and a cam surface leading to said opening, of a spring-actuated locking pin positioned to snap into the opening aforesaid or to bear on the cam surface aforesaid, a catch for holding the locking pin raised out of the opening aforesaid in position for engagement by the cam surface, said cam surface being adapted, on turning of the valve, to disengage the locking pin from its catch, and another catch for holding the locking pin entirely retracted.

4. In a safety gas cock or valve, the combination with a rotary or turning plug or valve having a locking pin opening, and a cam surface leading to said opening, of a longitudinally movable rotatable locking pin positioned to engage the locking pin opening and the cam surface, a spring co-acting with said pin and adapted to project it for engagement with the valve and also to rotate or turn it, and a catch adapted to hold said pin when turned and retracted out of the pin opening, whereby the pin can be engaged by the cam surface when the valve is turned and thereby disengaged from the catch to enable the spring to turn the pin and project it in position to lock the valve.

In testimony whereof, we hereunto affix our signatures in presence of two witnesses.

EDWIN R. BENNETT.
MELVIN I. EKERN.

Witnesses:
F. A. WARREN,
W. H. PHILLIPS.